Aug. 23, 1949.  M. F. CHUBB ET AL  2,479,603
STORAGE BATTERY PLATE AND PROCESS
FOR MAKING THE SAME
Filed Aug. 24, 1944
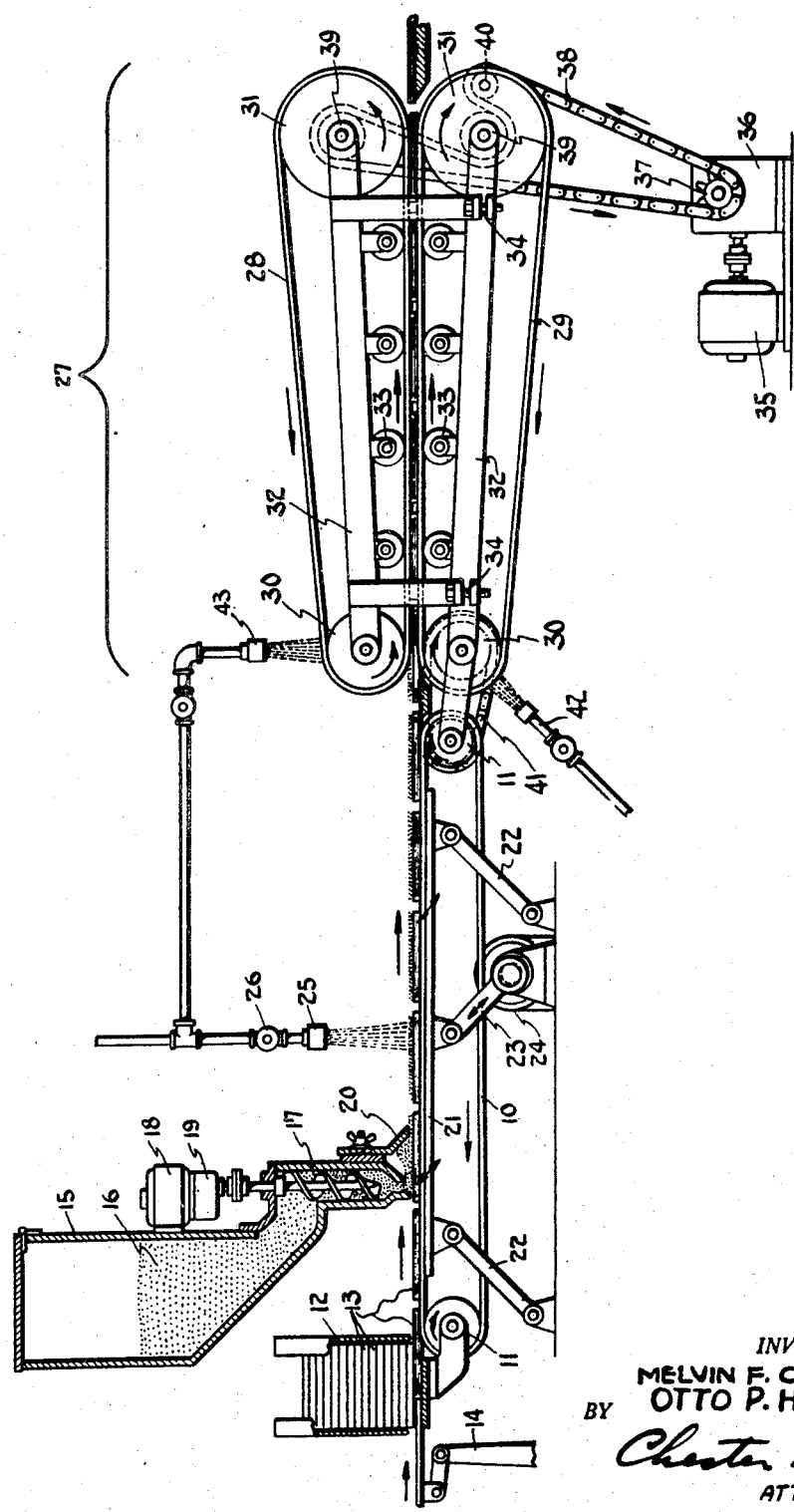
INVENTORS
MELVIN F. CHUBB
OTTO P. HENSE
BY
Chester Tietig
ATTORNEY Patented Aug. 23, 1949

2,479,603

UNITED STATES PATENT OFFICE 2,479,603

STORAGE BATTERY PLATE AND PROCESS FOR MAKING THE SAME

Melvin F. Chubb, Joplin, Mo., and Otto P. Hense, Cincinnati, Ohio, assignors to The Eagle-Picher Company, a corporation of Ohio Application August 24, 1944, Serial No. 551,000

6 Claims. (Cl. 136—67)

This invention relates to the preparation of plates for storage batteries of the lead accumulator type and more particularly relates to a plate fabricating process in which active material in the form of a dry powder is filled into a grid, and the grid is then moistened to set the powder whereby the plate becomes ready for charging.

Heretofore it has been the custom to fill lead grids with a paste made of lead oxide and weak sulfuric acid for the purpose of making storage battery plates. This is an exceedingly messy and unpleasant operation. A few attempts have been made to apply the dry powders and then moisten with sulfuric acid, but the paste thus formed had indifferent sticking properties and would not hold well enough to the grids to permit reasonably fast handling of the pasted plates.

According to the present invention, we are able to avoid the use of sulfuric acid by the use of basic lead sulfate in the paste. By the use of modern machinery it is possible to fill a grid with a mixture of dry lead oxide and basic lead sulfate without any health hazard from dust. After the dry powder is in place, we apply a limited amount of water and so induce the reaction that sets the powder into a hard mass. After the setting reaction, the plate can be handled quite roughly, without any excessive chipping, cracking or falling off of the paste.

In copending application Serial No. 523,934 of Chubb and Briggs there is disclosed the advantage of using coarse fused litharge having a burned-in content of from 6% to 50% by weight of red lead. The red lead forms a coating on each particle of litharge as it is "burned-in." Litharge surfaces may be restored to the burned-in particles by milling or by grinding. Patent No. 2,448,353, dated Aug. 31, 1948, issued to co-applicant, Melvin F. Chubb, relates to a fused litharge, each particle of which has a coating of red lead, and to a process for making it. We refer to material having a median diameter of particle ranging from 6 to 10 microns. The advantage of this material is that it can be formed very rapidly in the positive plate in an acid of working strength.

It may be this material that we use to mix with the basic lead sulfate or it may be any ordinary battery-maker's lead oxide. In any event, we use from 6% to 20% by weight of basic lead sulfate of 0.1 to 1.0 micron median radius which may be either hydrous or anhydrous and normally between the compositions of $2PbSO_4 \cdot PbO$ and $4PbSO_4 \cdot PbO$.

In the case of material intended for negative plates, we use the same compositions except for the addition of small quantities of lampblack, barium sulfate and organic expanders such as are well known in the art.

After the dry mixed composition is on the grid, where it may be placed with the aid of vibrating tables, etc., a measured quantity of water is added to each grid. The amount of water is adjusted as follows:

A fine spray is directed downward on the plate from an atomizing nozzle. The valve on this nozzle is adjusted again after it is ascertained whether an excess of water or a deficiency is being added as judged by the time at which the paste hardens. In general, more water, within limits, should be sprayed on in order to make the paste set sooner. 6% to 12% by weight is the proper amount.

Referring to the accompanying drawing, the figure is a side elevation of one of the forms of apparatus capable of carrying out the process.

In the drawing, 10 is a belt conveyor running over pulleys 11. Above the starting point of the travel there is a magazine 12 containing a plurality of battery grids 13 which are to be filled. 14 is a conventional reciprocating device adapted to assist deposition of one grid at a time on the belt. No novelty is claimed for it per se.

Above the belt and near its starting point there is a hopper 15 filled with the dry composition 16 to be applied. A worm, screw or other feeding device 17 is mounted vertically adjacent the hopper and is driven by a motor 18, provided with a reducing gear 19. A doctor blade 20 is adjustably mounted on the feeder housing so that the composition may be leveled to various selected heights depending upon the thickness of the grids to be pasted.

Under the top portion of belt 10 there is a vibrating plate 21, to which are attached in an offset manner so as to avoid the lower part of belt 10, a pair of links 22, and an eccentric-driven vibrator shaft 23. Its speed of vibration is adjusted by varying the speed of the driving motor 24, so that the dry composition is settled in the grids and densified by vibration. An electric vibrator is equally satisfactory.

At a point near the place where the grids emerge from under the doctor blade, there is a spray-head 25 adapted to shower the filled grids with a fine spray of water as already discussed. A regulating valve 26 is essential.

At the exit end of the apparatus there is a compressing portion of a battery plate processing machine which is the subject matter of application Serial No. 523,933 of M. F. Chubb, now Patent No. 2,474,091, dated June 21, 1949. Here its function is to additionally moisten the paste and to force it further into the grid and increase its density.

The processing section comprises two abutting belts 28 and 29 of absorbent fabric which run over pulleys 30 (left hand, smaller) and 31 (right hand, larger). A frame 32 spaces the pulleys and provides pressure which is exerted by rolls 33. Regulating screws 34 are provided to put more or less pressure on the rolls and pulleys as desired.

An electric or other motor drives the apparatus through a speed reducer 36, which has a sprocket 37 impelling a chain 38, which is looped around sprockets 39 on the large pulleys 31. An idler 40 is also provided to regulate tension.

Belt 10 is driven from lower pulley 30 by means of a chain 41 running over sprockets not shown. Water sprays 42 and 43 are provided to moisten each of the belts 28 and 29.

The method of operation of the process when the described apparatus is used, is as follows:

Motors 24 and 35 and the drive for shaker 14 are energized. As soon as the grids 13 are being traversed by belt 10, motor 18 is energized to activate screw-feed 17. The valves for sprays 25, 42 and 43 are turned on, preferably in advance of the arrival of the grids. The speed of the belts and the amount of water supplied should be so co-ordinated that the plates are hard but not dry when they leave the machine at the delivery end. It is not necessary for them to harden before they are pressed by the processor section 27, although no harm is done if they have hardened. Bolts 34 are adjusted so that the rolls 33 will force the paste into the grids and smooth the paste surface, eliminating checks and cracks, but will not waste energy in attempting to compress the grid itself.

Operation is continuous, the sole duties of the attendant being to keep hopper 15 full of composition, magazine 12 full of grids, to regulate the water sprays and to adjust the pressure on rolls 33 by means of bolts 34. He may also regulate the speed of the entire machine by regulating the speed of motor 35 by means of a rheostat or variable speed transmission not shown.

We prefer that the dry apparent density of the active material in a battery plate should be 4.00 to 4.25 grams per milliliter. The apparent density of the dry powder made from various lead oxides blended with 5% to 20% by weight of basic lead sulfate is only 1.25 to 2.0 grams per milliliter. This is the reason for overfilling the grid before moistening it with water and then compressing it immediately after adding the water but before the setting reaction takes place.

We have found that this reaction goes forward as long as there is at least 25% of lead monoxide in the oxide blend. The presence of normal amounts of free metallic lead, red lead, barium sulfate, lampblack, or the other additive materials commonly used in either positive or negative plates has been without deleterious effect on the basic reaction. We have also found that normal precipitated lead sulfate of fine particle size (0.1 to 1.0 micron median radius) can be used instead of basic lead sulfate, although the reaction is slightly more difficult to initiate, hot water in some cases being required instead of room temperature water such as is satisfactory with the basic lead sulfate. In either case, enough basic lead sulfate or lead sulfate is blended with the lead oxide and other dry ingredients desired in the plate, the amount of the sulfate usually 10 to 14% of the total to obtain the desired amount of reaction. In special cases we have used as little as 5% basic lead sulfate, and in others as much as 20%, so we do not wish to be limited to the preferred 10 to 14% range. Thick heavy duty plates, for example, must be formulated quite differently than thin automotive plates.

As an example of our process by means of which those skilled in the art of making storage battery plates may be able to duplicate our results, we may proceed as follows:

Positive plate procedure

Dry blend together:

Commercial battery red lead _____ parts by weight__ 20
Commercial battery litharge _____ parts__ 68
Basic lead sulfate _____ do____ 12

Using standard starting and lighting type grids .080 inch in thickness and having a net pasting volume of about 1.75 cubic inches, place 66 grams of the dry powder for each cubic inch of grid volume on the grid and work it into the grid under pressure, distributing the excess smoothly on the top surface. Moisten the top surface with 10 milliliters of water and pass the filled grid between pressure rolls covered with wet cloth to complete the moistening of the oxide and compress it into the grid. The filled plates are then stacked one upon the other for the bonding to proceed to completion.

Negative plate procedure

Dry blend together:

| | Parts by weight |
|---|---|
| Leady litharge | 91 |
| Normal lead sulfate | 8 |
| Blanc fixe | 0.5 |
| Lampblack | 0.25 |
| Hydroquinone | 0.25 |

Then, using standard starting and lighting type grids .070 inch in thickness and having a net pasting volume of about 1.5 cubic inches, place 69 grams of the dry powder for each cubic inch of grid volume on the grid and work it into the grid under pressure, distributing the excess smoothly on the top surface. Moisten the top surface with 10 milliliters of water at 150° F. and pass the filled moistened plate between pressure rolls covered with cloth also wet with 150° F. water to complete the moistening of the oxide and compress it into the grid. The filled plates are then stacked one upon the other for 16 hours for the bonding to proceed to completion.

We claim as our invention:

1. The process of preparing plates for storage batteries of the lead accumulator type which comprises overfilling a lead battery grid with a substantially dry composition comprising litharge, red lead and a material selected from the group consisting of basic lead sulfate and normal lead sulfate, working the composition into the grid under mechanical pressure, distributing the excess smoothly on the grid surface, moistening said surface with substantially 6 to 12 percent water to cause the composition to harden after an interval of time, then prior to completion of the hardening pressing the composition upon the grid.

2. The process of preparing plates for storage batteries of the lead accumulator type which comprises overfilling a lead battery grid with a substantially dry composition comprising litharge and a material selected from the group consisting of basic lead sulfate and normal lead sulfate, working the composition into the grid under mechanical pressure, distributing the excess smoothly on the grid surface, moistening said surface with substantially 6 to 12 percent water to cause the composition to harden after an interval of time, then prior to completion of the hardening pressing the composition upon the grid.

3. The process of preparing plates for storage batteries of the lead accumulator type which comprises overfilling a lead battery grid with a substantially dry composition comprising fused litharge particles coated with burned-in red lead and a material selected from the group consisting of basic lead sulfate and normal lead sulfate, working the composition into the grid under mechanical pressure, distributing the excess smoothly on the grid surface, moistening said surface with sufficient water to cause the composition to harden after an interval of time, then pressing the composition upon the grid.

4. The process of preparing plates for storage batteries of the lead accumulator type which comprises overfilling a lead battery grid with a substantially dry composition comprising litharge, red lead and 5% to 20% by weight of a material selected from the group consisting of basic lead sulfate and normal lead sulfate, working the composition into the grid under mechanical pressure, distributing the excess smoothly on the grid surface, moistening said surface with substantially 6 to 12 percent water to cause the composition to harden after an interval of time, then prior to completion of the hardening pressing the plate between wet absorbent surfaces and then stacking the plates in close contact until the bonding reaction proceeds to completion.

5. The process of preparing plates for storage batteries of the lead accumulator type which comprises overfilling a lead battery grid with a substantially dry composition comprising litharge, red lead, and 10% to 14% by weight of a material selected from the group consisting of basic lead sulfate and normal lead sulfate, working the composition into the grid under mechanical pressure, distributing the excess smoothly on the plate surface, moistening said surface with substantially 6 to 12 percent water to cause the composition to harden after an interval of time, then prior to completion of the hardening pressing the plate between wet absorbent surfaces and then stacking the plates in close contact until the bonding reaction proceeds to completion.

6. A positive plate for storage batteries which comprises a grid filling containing fused litharge coated with burned-in red lead and a member of the group consisting of basic lead sulfate and normal lead sulfate, said filling having been applied to the grid as a substantially dry composition and having been hardened by the addition of water in limited quantity and compressed.

MELVIN F. CHUBB.
OTTO P. HENSE.

REFERENCES CITED

The following references are of record in the file of this patent:

UNITED STATES PATENTS

| Number | Name | Date |
|---|---|---|
| 417,088 | Pumpelly | Dec. 10, 1889 |
| 422,457 | Sorley | Mar. 4, 1890 |
| 1,572,512 | Benner | Feb. 9, 1926 |
| 1,572,586 | Weir | Feb. 9, 1926 |
| 1,622,304 | Angell | Mar. 29, 1927 |
| 1,668,801 | Calbeck | May 8, 1928 |
| 2,182,479 | Johnstone | Dec. 5, 1939 |

FOREIGN PATENTS

| Number | Country | Date |
|---|---|---|
| 185,023 | Great Britain | Aug. 31, 1922 |

OTHER REFERENCES

Vinal, G. W., Storage Batteries, 3rd Ed. (1940), pp. 26–28.